No. 670,611. Patented Mar. 26, 1901.
C. HOFFMANN.
MOUTHPIECE FOR PRESSES FOR THE MANUFACTURE OF PIPES AND PROTECTING COVERS MADE OF PLASTIC MATERIALS.
(Application filed Dec. 27, 1900.)
(No Model.)

a-b

UNITED STATES PATENT OFFICE.

CARL HOFFMANN, OF MAGDEBURG, GERMANY, ASSIGNOR TO FRIED. KRUPP GRUSONWERK, OF MAGDEBURG-BUCKAU, GERMANY.

MOUTHPIECE FOR PRESSES FOR THE MANUFACTURE OF PIPES AND PROTECTING-COVERS MADE OF PLASTIC MATERIALS.

SPECIFICATION forming part of Letters Patent No. 670,611, dated March 26, 1901.

Application filed December 27, 1900. Serial No. 41,226. (No model.)

*To all whom it may concern:*

Be it known that I, CARL HOFFMANN, a subject of the King of Bavaria, and a resident of Magdeburg, Kingdom of Prussia, Empire of Germany, have invented a new and useful Improvement in Mouthpieces for Presses for the Manufacture of Pipes and Protecting-Covers Made of Plastic Materials, of which the following is a specification.

Figure 4:
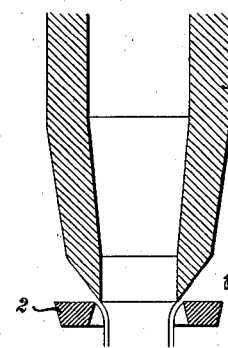

For making pipes of lead, gutta-percha, and other plastic materials and for covering cables or other prismatic bodies with protecting-covers of these materials presses are employed which press the plastic material contained in a receiver under high pressure by means of one or several plungers through an annular aperture formed by a matrix and a mandrel, the section of which corresponds to dimensions of the pipe to be pressed. When making pipes, this mandrel may be solid, while when covering cables and such like it is provided with an axial bore to allow of the passage of the cables. With the mouthpiece used up to now, consisting of a beveled hollow mandrel 1 and a circle-shaped matrix 2, as shown by Figure 4, these two forming a concentric annular hole corresponding to the section of the pipe, there arise various inconveniences such as to render the manufacture of smooth and uniform pipes very difficult. In the plastic but not liquid material the pressure does not continue in a uniform way, but the material is pressed the hardest on the side of the mandrel nearest the press-rams and is driven more rapidly through the annular aperture than at the opposite sides. Owing to this a pipe of irregular section is produced and upsetting takes place in the wall of the pipe, which causes the forming of wrinkles. Besides, the mandrel, which for the sake of solidity is of a pronounced beveled shape, causes the material coming out of the mouthpiece to take the direction of the generatrix of the bevel. (See Fig. 4.) The consequence is a strong contraction of the material, by which means the diameter of the pipe diminishes and upsetting and wrinkles occur in the pipe-walls.

By the present invention the above-mentioned inconveniences are avoided, the mouthpiece, consisting of hollow mandrel and matrix, being formed in such a way that the material comes out with equal speed all around and takes a direction as parallel as possible to the axis of the mandrel. In order to obtain this, a feeding-ring is placed before the matrix, the bore of which is, however, not circular, but is made in such a manner that the play between the mandrel and this ring is widest at those spots of the mouth which are farthest away from the plungers, while it gradually diminishes toward the spots nearest the plungers, where it is narrowest. During the operation the plastic material is at the narrower spots throttled more or less, according to its smaller or greater distance from the plungers, and thus forced to emerge from the mouth at an equal speed. The contraction of the pipe-section is prevented in a simple manner by providing the beveled surface at the end of the mandrel with a circular flute, so that the material is forced to go out of the mouthpiece, taking a direction as parallel as possible to the axis of the mandrel.

Figure 1:
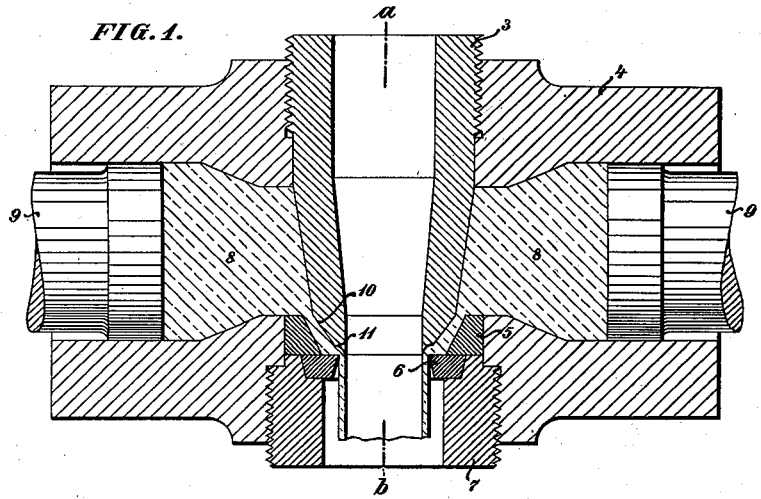
Figure 2:
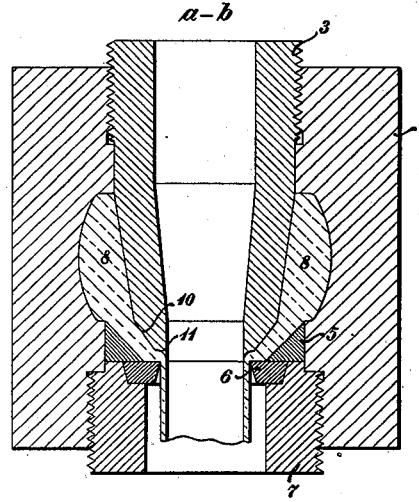
Figure 3:
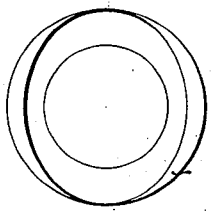
Figure 3:
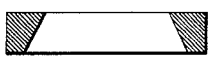

Figs. 1 to 3 show the above arrangements. Fig. 1 is a longitudinal section through the mandrel, the matrix, and the two receivers of a cable-press. The hollow mandrel 3 is screwed into the wall of the receiver 4. In the opposite wall the feeding-ring 5 and the matrix 6 are held in position by the matrix-holder 7, screwed on. The space 8 serves as a chamber into which the plastic material is pressed out of the receivers 4 by the plungers 9 and from which it comes through the mouthpiece either as a simple pipe or as a cover for a cable or for another prismatic body simultaneously conducted through the aperture of the mandrel. Fig. 2 is the cross-section of the arrangement. In Fig. 1 the feeding-ring is cut at the points nearest the plungers, and therefrom the annular space between mandrel and feeding-ring shows here its smallest section, while the cut, Fig. 2, is made through the two points of the annular space which are farthest away from the plungers, and consequently have the largest cross-section. Fig. 3 represents the upper view of the feeding-ring and shows the varying diameter of the inner cavity. This ring may also be made in one piece with the matrix.

The bevel 10 of the mandrel 3 is provided with the circular flute 11 in such a way that the tangent of the latter on the outlet runs in an almost parallel direction with the axis of the mandrel. Owing to this the material deflects from the direction given by the bevel 10 and takes the direction of the axis of the mandrel. The purpose of this arrangement is to avoid a diminution of the diameter of pipe required.

I claim—

In order to obtain a uniform exit of the material taking the direction of the axis when using presses for the manufacture of pipes or protecting-covers of plastic materials, for cables or the like, the arrangement of a mouthpiece conducting the material to be treated to the matrix 6 between a hollow mandrel 3, having at the end a circular fluted beveled surface 11, and a feeding-ring 5, this ring being of such a shape as to narrow at the points near the pressing-ram 9 the section between itself and the hollow mandrel and thus to act as a throttle while a larger passage-section is left for the material at the other points.

The foregoing specification signed at Magdeburg, Germany, this 7th day of December, 1900.

CARL HOFFMANN.

In presence of—
 WILHELM FLEISCHHACK,
 M. J. BAEHR.